United States Patent [19]

Sticht

[11] 4,275,976
[45] Jun. 30, 1981

[54] PNEUMATIC CONVEYOR SYSTEM

[76] Inventor: Walter Sticht, Wankhamerstr. 8, A-4800 Attnang-Puchheim, Austria

[21] Appl. No.: 81,869

[22] Filed: Oct. 4, 1979

[30] Foreign Application Priority Data

Jun. 25, 1979 [AT] Austria .................................. 4420/79

[51] Int. Cl.³ .............................................. B65G 53/40
[52] U.S. Cl. ......................................... 406/28; 406/19; 406/31; 406/93; 406/183; 406/148
[58] Field of Search ....................... 406/19, 21, 22, 28, 406/29, 31, 83, 84, 93, 94, 95, 148, 149, 150, 153, 183, 192, 176; 221/278; 198/953

[56] References Cited

U.S. PATENT DOCUMENTS

| 1,339,594 | 5/1920 | Botscheider | 406/31 X |
| 2,241,917 | 5/1941 | Mehlis et al. | 406/31 X |
| 3,351,388 | 11/1967 | Frank | 406/153 X |
| 3,625,570 | 12/1971 | Ford | 198/953 X |
| 4,165,845 | 8/1979 | Carstens et al. | 406/192 |
| 4,178,662 | 12/1979 | Borodin | 406/21 X |

FOREIGN PATENT DOCUMENTS

| 2408577 | 9/1975 | Fed. Rep. of Germany . | |
| 2417685 | 10/1975 | Fed. Rep. of Germany . | |
| 11590 | of 1915 | United Kingdom | 406/93 |

Primary Examiner—Jeffrey V. Nase

[57] ABSTRACT

A pneumatic conveyor system adapted for the conveyance of assembly parts comprises a tubular conveyor conduit, a pneumatically operable drive in the conveyance path defined by the conduit, a control for operating the drive and an inlet metering device associated with the conveyor conduit upstream of the drive. The metering device includes a blocking mechanism responsive to the control for cyclically blocking and unblocking the conveyance path.

17 Claims, 5 Drawing Figures

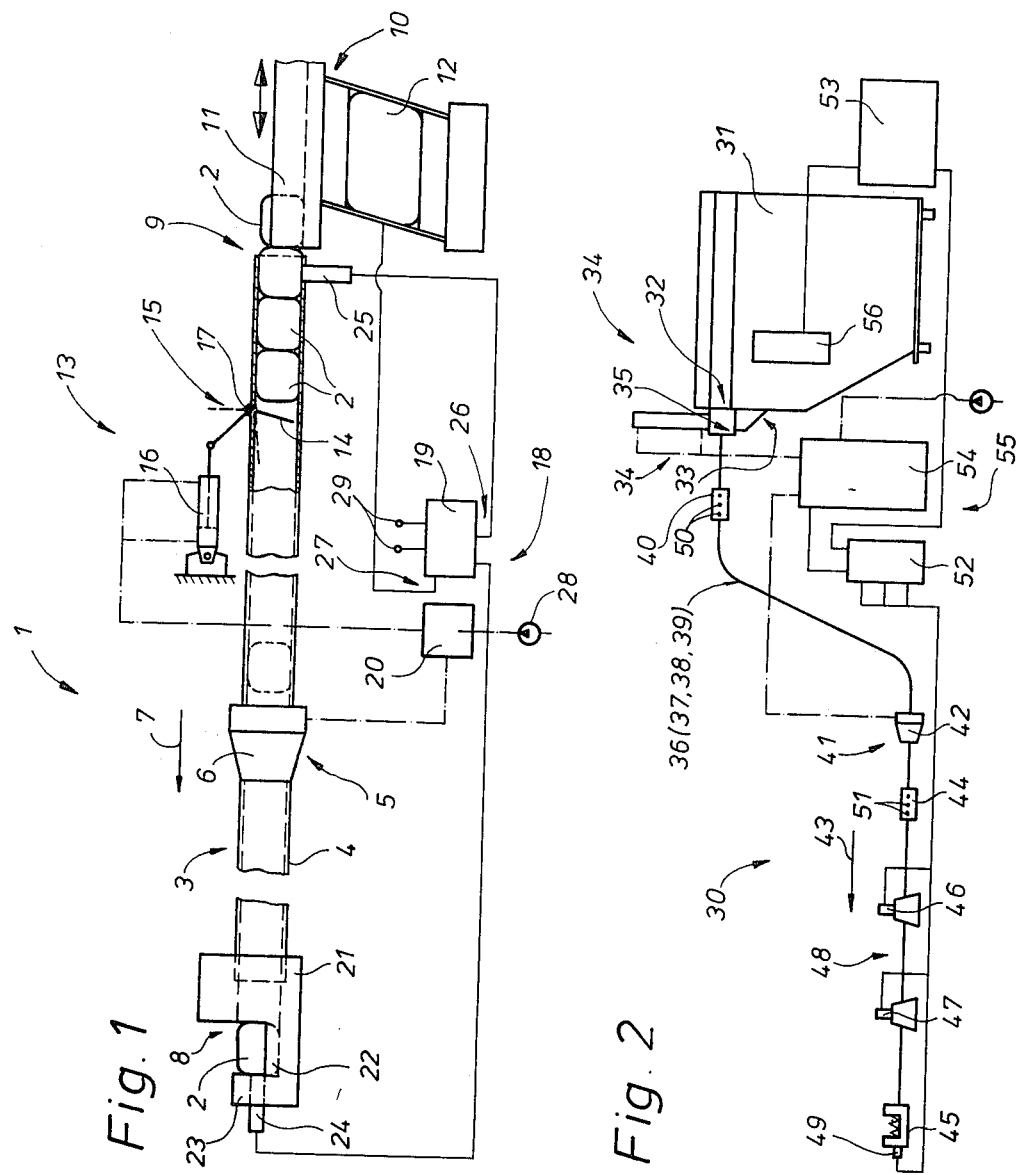

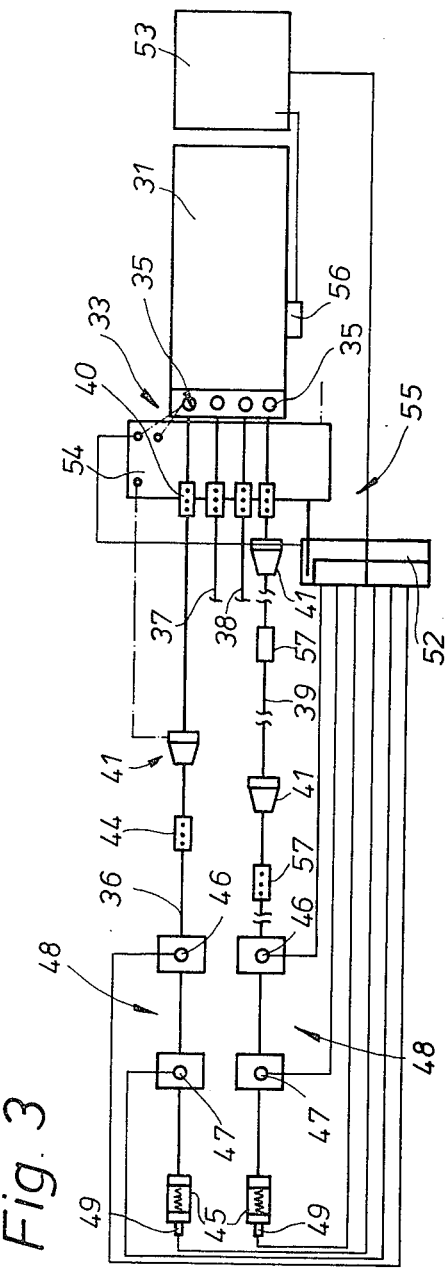
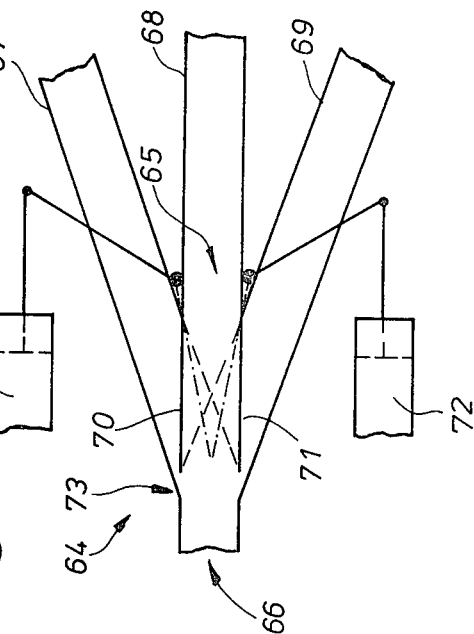
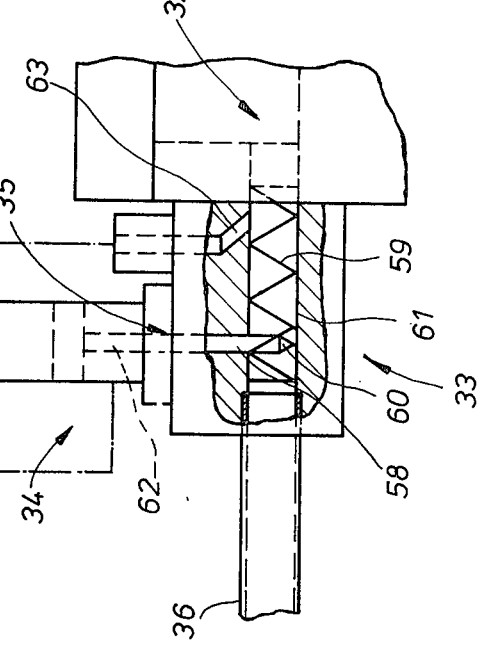
Fig. 3
Fig. 5
Fig. 4

PNEUMATIC CONVEYOR SYSTEM

The present invention relates to improvements in a pneumatic conveyor system adapted for the conveyance of assembly parts, such as springs, comprising a tubular conveyor conduit having an inlet and defining a conveyance path, a pneumatically operable drive means in the conveyance path for moving the assembly parts therealong, and a control for operating the drive means.

A conveyor system of this type has been disclosed in Accepted German Patent Application No. 2,417,685 in which the system is associated with a spring coiling machine for conveying the coiled springs to a machine for grinding the ends of the springs. The drive means of this conveyor system consists of an air jet in the inlet area of the conveyor conduit for directing the coiled springs along the conveyance path under the air pressure applied to the air jet generating means. The low pressure produced upstream of the air jet causes the springs to be sucked into the inlet and the springs are then conveyed pneumatically through the conduit to an outlet at the end of the conduit. Experience has shown that this system does not function properly under all operating conditions. For instance, when operation of the system is resumed after an interruption, several springs may be sucked into the conduit simultaneously and this may cause an accumulation of parts choking the inlet and/or the conduit.

In another penumatic conveyor system disclosed in Published German Patent Application No. 2,408,577, an air jet drive for conveying cups through the conveyor conduit is arranged upstream of the conduit in the area where the cups are received. The air jet generating means is comprised of a combined suction and accelerating nozzle receiving air under pressure from a compressor. The low pressure produced upstream of the air jet is used to draw off individual cups from a conveyor arranged ahead of the air jet and to move these cups to the conveyor tube. The cups are then conveyed through the tube pneumatically and indicating devices are mounted at the outlet of the conveyor tube for signalling the extend to which the tube is filled with cups. The output signals of these devices are used to control the movement of the conveyor transporting the cups to the air jet. A storage path precedes the outlet in the conveyor conduit and to avoid excess pressure in this path, air vents are provided therealong to enable some of the air under pressure to escape from the storage path. The air pressure produced by the air jet in this system is so high that some cups may still be sucked into the conveyor conduit after the movement of the cup conveyor has been halted in response to a control signal indicating the storage path to be filled with cups. This produces an undue accumulation of cups and jamming of the conveyor conduit. Furthermore, exact metering of the number of cups conveyed to the conveyor conduit is not possible so that jamming of the conduit may also occur when too many cups are sucked into the inlet.

It is the primary object of this invention to improve a pneumatic conveyor system of the first-described type so that rapid and trouble-free conveyance of assembly parts through the conveyor conduit is assured with an economic supply of air and the avoidance of jamming.

The above and other objects are accomplished in accordance with the invention by an inlet metering device associated with the conveyor conduit upstream of the drive means, the metering device including a blocking mechanism responsive to the control for cyclically blocking and unblocking the conveyance path.

With such a device, it has for the first time become possible to monitor and control the number of assembly parts fed to the system accurately and in a simple manner so that this number corresponds to the required amount of air delivered to this system for conveying the assembly parts therethrough. The metering device avoids the feeding of excessive numbers of assembly parts which cannot be handled by the air delivered to the system whereby jamming of the tubular conveyor conduit is avoided. Furthermore, the metering of the assembly parts fed to the system makes it possible to determine the exact amount of air required for their conveyance through the conduit so that this amount of air may be determined accurately for each operating stage, providing important economies in this respect. In addition, jamming at the inlet of the conveyor conduit is also avoided since the blocking mechanism prevents this due to the lower pressure prevailing at the inlet upstream of the drive means.

The above and other objects, advantages and features of the present invention will become more apparent from the following detailed description of certain now preferred embodiments thereof, taken in conjunction with the highly schematic drawing wherein FIG. 1 is a diagrammatic side elevational view of one embodiment of the pneumatic conveyor system of this invention;

FIG. 2 is a like diagrammatic view of another embodiment associated with an apparatus for disentangling assembly parts;

FIG. 3 shows a diagrammatic top view of FIG. 2, illustrating a plurality of parallel conveyor conduits;

FIG. 4 is an enlarged fragmentary side elevational view, partly in section, of the inlet metering device used in the embodiment of FIGS. 2 and 3; and FIG. 5 is a fragmentary top view of another embodiment of an inlet metering device for use with the system of this invention.

Referring now to the drawing and first to FIG. 1, pneumatic conveyor system 1 is shown adapted, by way of example, for the conveyance of assembly parts 2 constituted by cylindrical rollers. System 1 comprises tubular conveyor conduit 3 constituted in the exemplified embodiment by synthetic resin tube 4. The inner diameter of tube 4 slightly exceeds the diameter of cylindrical assembly parts 2 conveyed therethrough. The tubular conveyor conduit defines a conveyance path between inlet 9 of the conduit and outlet 8 thereof, and pneumatically operable drive means 5 is arranged in the conveyance path centrally between the inlet and the outlet for moving assembly parts 2 from the inlet to the outlet in the direction of arrow 7. In the illustrated embodiment, drive means 5 comprises venturi tube 6.

The use of a venturi tube for driving the assembly parts along the conveyance path has the advantage that the lower pressure upstream of the venturi tube can be used for sucking the parts into the conveyor conduit inlet at an increased speed unless they are blocked from entering the conduit in a manner to be described hereinafter. The central arrangement of the venturi tube optimally utilizes the double action thereof, moving the assembly parts along half the conveyance path under suction and along the other half of the conveyance path under pressure.

In the embodiment of FIG. 1, assembly parts 2 are fed to inlet 9 of conveyor system 1 by vibratory conveyor 10 equipped with baffle plate 11 for orienting and classifying the assembly parts, the baffle plate being oscillated in a longitudinal direction, as indicated by a double-headed arrow, by an oscillating mechanism 12.

According to this invention, inlet metering device 13 is associated with conveyor conduit 3 upstream of drive means 5 to meter assembly parts 2 fed by vibratory conveyor 10 into inlet 9. The metering device includes blocking mechanism 15. In the illustrated embodiment, the blocking mechanism comprises blocking member 14 movable into and out of conveyance path for blocking and unblocking conveyance through conduit 3 and adjustment drive 16 for moving the blocking member. The illustrated blocking member is a flap mounted for pivoting about axis 17 extending transversely to conduit 3 and the adjustment drive is a pneumatic motor 16 linked to flap 14 for pivoting the flap between a blocking position shown in full lines and an unblocking position shown in broken lines. In its blocking position, flap 14 constituting a stop for assembly parts 2 fed into inlet 9 by vibratory conveyor 10, which securely prevents even parts moving rapidly under high suction forces from proceeding along the conveyance path.

Control 18 is arranged to operate drive means 5 and blocking mechanism 15 of inlet metering device 13 is also responsive to the control for cyclically blocking and unblocking the conveyance path. The control comprises electrical control block 19 having an input and output, and pneumatic pressure control block 20 whose outputs are connected respectively to venturi tube 6 and pneumatic motor 16 for operating drives 5 and 6.

Outlet 8 of conveyor conduit 3 is arranged for manual removal of the conveyed parts and comprises bracket 21 receiving the end of tube 4. The bracket has guide portion 22 defining a guide groove at the bottom thereof. In this manner, an upper portion of the conveyance path is open in the outlet area to enable the conveyed parts to be removed manually at outlet 8 and the length of guide portion 22 is less than that of the conveyed parts. Guide portion 22 has a bore facing the end of the tube 4 and having a diameter enabling assembly parts 2 to glide therethrough and abutment 23 is mounted on the guide portion opposite the bore at the end of the conveyance path.

Sensing device 24 is arranged in the end area adjacent abutment 23 and, in the illustrated embodiment, also adjacent inlet 9 for signalling the presence of assembly parts. The sensing devices may be conventional pulsors or optical eyes sensing the presence of assembly parts. The outlet signals of the sensing devices are connected to input 26 of control block 19 and to air pressure for receiving the output signals. Oscillating mechanism 12 of assembly part feeding apparatus 10 is solenoid-controlled, the input of the solenoid being connected to output 27 of control block 19 for receiving the output signals thereof. Compressor 28 delivers air under pressure to air pressure distributing block 20 and the output of block 20 is connected to venturi tube 6 and motor 16.

Providing the above-described manual outlet station has the advantage that the properly disentangled and oriented assembly parts, such as springs, will be ready for manual removal at the outlet, thus facilitating the work of personnel removing these parts for assembly on an endless manufacturing conveyor.

Pneumatic conveyor system 1 described hereinabove operates in the following manner.

Assembly parts 2 are fed to inlet 9 of conveyor conduit 3 by vibratory conveyor apparatus 10. Timing devices 29 on control 18 are set to provide cyclical blocking and unblocking of the conveyance path, the movement of assembly parts 2 into the conveyor conduit being periodically stopped by the timed control signals from control 18 to blocking mechanism 15, these signals operating motor 16 to pivot flap 14 into the path of the assembly parts to halt their movement and out of their path to permit movement thereof. Assembly parts 2 are driven through conveyor conduit 3 by the air supplied from air distributing control box 20 to venturi tube 6 generating suction in the portion of the conveyor conduit upstream of the venturi tube and pressure in the downstream portion, thus causing the assembly parts in tube 4 to move from inlet 9 to outlet 8. In addition, when flap 14 is lifted out of the conveyance path, the suction at the inlet causes the assembly parts coming from conveyor apparatus 10 to be sucked into the conveyor conduit. Depending on the set timing of the blocking and unblocking intervals and the length of the conveyor conduit, only a predetermined number of assembly parts, for instance 2 or 3, can pass through inlet metering device 13 at any one time, after which movement of succeeding assembly parts is stopped by downwardly pivoted flap 14. This increases the driving force of venturi tube 6 whose suction and pressure is now available exclusively for moving the assembly parts in tube 4 therethrough, thus providing an efficient and dependable driving force for the assembly parts through the system with an economic amount of air.

When an assembly part 2 reaches outlet 8, sensing device 24 will sense its presence and transmit a control signal to control 18 until the operator at the outlet station manually removes the assembly part or the part is mechanically removed. This control signal will cause blocking mechanism 15 to assume its blocking position to prevent feeding of further assembly parts into the system until the assembly part has been removed from outlet 8. The signal may also be applied to air distributing box 20 to prevent further air supply to venturi tube 6 so that driving force is applied to the assembly parts in conveyor conduit 3 only when the assembly part at outlet 8 has been removed and the control signal from sensing device 24 is accordingly discontinued. While flap 14 is in the blocking position, vibratory conveyor apparatus 10 continues to feed assembly parts 2 to inlet 9 until the assembly parts stored in the inlet upstream of closed flap 14 reach the point where sensing device 25 is located, whereupon this device senses the presence of the assembly part and transmits a control signal to control block 19, triggering an output signal at 27 to oscillating mechanism 12 to halt its operation and thus to prevent further feeding of assembly parts. In this manner, energy for conveyor system 1 is economically used only when an assembly part is needed at outlet 8.

FIG. 2 illustrates an embodiment in which pneumatic conveyor system 30 is associated with apparatus 31 for disentangling such complexly shaped assembly parts as springs, orienting the disentangled springs and classifying the oriented springs. Throughout the specification and claims, the term "springs" designates any type of assembly part of shape tending to cause entanglement of such parts when heaped in a mass.

Apparatus 31 has outlets 32 for the oriented and classified springs, and conveyor conduits 36, 37, 38 and 39 have outlets 45 remote from outlets 32, transfer conduits 33 being arranged between outlets 32 and the inlets of the conveyor conduits. Inlet metering device 34 including blocking mechanism 35 is arranged in the transfer conduits. Drive means 41 constituted by venturi tube 42 is mounted substantially centrally in each conveyor conduit to drive the springs therethrough in the direction of arrow 43. Air inlet member 40 is arranged in each conveyor conduit between inlet metering device 34 and drive means 41 and air venting member 44 is arranged in each conveyor conduit between drive means 41 and outlet 45. The air inlet and venting members are perforated tubular portions inserted in the conveyor and, according to a preferred feature of the invention, the conveyor conduits have a cross-sectional area exceeding the total areas of perforations 50, 51 in the tubular portions.

The provision of the air inlet and venting members has the advantage that the suction and pressure forces in the conveyor conduit may be accurately balanced, thus avoiding, for example, jamming of parts in the area of the inlet metering device, due to excessive suction. Using perforated tubular portions with the indicated dimensional relationships of air intake and venting perforations provides a very simple means for determining the speed of conveyance of the assembly parts through system 30 by suitably decelerating or accelerating the movement of the parts. This enables even sensitive assembly parts to be moved through the system at carefully controlled speeds to avoid impacts of adjacent parts on each other, which may cause entanglements in the conveyor conduits. The presence of an air inlet member relatively close to the inlet metering device, in particular, enables the suction upstream of the drive means to be carefully controlled to avoid jamming in the metering device.

As shown in FIG. 2, each conveyor conduit comprises storage path 48 upstream of outlet 45 and air venting member 44 is arranged substantially centrally between drive means 41 and storage path 48. Sensing devices 46 and 47 signalling the presence of an assembly part in the conveyor conduit are spaced from each other in the direction of the conveyance path and a respective one of the sensing devices is arranged at the beginning and the end of the storage path. A further sensing device 49 is arranged at outlet 45, similarly to the analogous arrangement in FIG. 1. This arrangement enables the conveyance speed to be slightly reduced by venting a certain amount of air between drive means 41 and the storage path and the outlet, thus avoiding possible jamming of the assembly parts in this portion of the system and reducing the impact of succeeding parts on each other. Providing a storage path bounded by two sensing devices constitutes a further safety measure since the control signals from the sensing devices provide a storage area for assembly parts in the conduit.

The outlet signals from sensing devices 46, 47 and 49 are transmitted to control block 52 whose input is connected to the sensing devices. One output of control 52 is connected to the input of control 53 for apparatus 31 for receiving output signals from control 52 while another output of control 52 is connected to control block 54 of control 55 which, analogously to control 18 of the embodiment of FIG. 1, operates drive means 41 and blocking mechanism 35. Air distributing control box 54 is connected by air conduits to the pneumatic motor of blocking mechanism 35 of inlet metering device 34 and to venturi tube 42 of drive means 41.

As the above description of the structure of conveyor system 30 indicates, this system operates substantially in the same manner as system 1, air delivery to drive means 41 and stoppage of drive 56 of apparatus 31 through control 53 being interrupted when sensing device 46 at the end of storage path 48 transmits a control signal to control block 52, i.e. no more parts will be fed to conveyor system 30 by apparatus 31 and no parts will be driven through the conveyor system once the storage part is filled with assembly parts. Operation of the air inlet and venting members 40 and 44, that is, opening and closing of selected ones of their air inlet perforations 50 and venting perforations 51, will control the conveyance speed, i.e. the driving force exerted upon the assembly parts in the conveyor conduit. The air suction and pressure in the conveyor conduit is a direct function of the amount of air therein.

Such a fine-tuned conveyor system enables the work to be done with a minimum of air supply and further reduces the energy consumption of the disentangling apparatus which will operate only as long as the conveyor system can handle the disentangled parts fed thereto. In addition, the controlled interruption of the disentangling operation will prevent apparatus 31 from feeding disentangled parts to the blocked conveyor system, which would cause re-entanglement of the parts and undue wear thereof by subsequent disentangling.

FIG. 3 shows the four conveyor conduits 36, 37, 38 and 39 arranged in parallel and, as shown therein, each conveyor conduit has its own control 55 for independent control of each conduit. Each conduit is set in operation only when end sensing device 47 of storage path 48 no longer transmits a control signal, i.e. when the storage path is empty. Furthermore, drive 56 of apparatus 31 is stopped only when all storage paths 48 of conveyor conduits 36, 37, 38 and 39 are full, i.e. control 52 produces an output signal transmitted to control 53 of apparatus 31 only when all four output signals are received at the input of control 52.

As indicated in connection with conveyor conduit 39, several drive means 41 may be arranged in series in the conduit if the conveyance path is unduly long and/or the assembly parts are heavy so that the conveyance of the parts is boosted along the conveyance path. This requires the insertion of usually combined air inlet and venting members 57 between adjacent drive means 41.

FIG. 4 shows a preferred transfer conduit 33 on an enlarged scale. In this embodiment, the blocking member of blocking mechanism 35 is a pin 58 movable transversely into the conveyance path and capable of retaining assembly parts 59 when moved into the conveyance path. Retaining pin 58 has point 60 at the leading end thereof. Such a blocking member is of particular advantage for use with spring assembly parts because it is capable of retaining a spring along its entire length without damaging it, as illustrated in FIG. 4. A pointed pin can pass between the coils of the spring.

As shown in the drawing, transfer conduit 32 defines passage 61 for springs 59 and has transverse bore 62 communicating with passage 61, pointed pin 58 being slidable in bore 62 into and out of passage 61. The pin is shown as a piston rod of a pneumatic motor constituting an adjustment drive for sliding the pin, the motor being supported on the transfer conduit.

Furthermore, air jet means 63 in transfer conduit 32 is directed countercurrently to the direction of conveyance of springs 59. The air jet means is connected to air distributing box 54 which receives timed control signals from control 52 to deliver blasts of air in the feeding direction of the springs, which tends to separate any jammed or entangled springs in the transfer conduit and thus assures a trouble-free delivery of individualized assembly parts through passage 61 into the conveyor conduit.

The compact structure of the transfer conduit illustrated in FIG. 4 makes it possible to equip an existing apparatus designed for disentangling, orienting and classifying assembly parts with a transfer piece connecting it to a pneumatic conveyor system, the air jet means in the transfer piece preventing jamming and re-entanglement of parts during transfer even when the conveyance of the parts is temporarily interrupted. The entire system is further improved by the provision of a plurality of conveyor conduits, each independently operable for complete coordination of the conveyor system with apparatus 31.

FIG. 5 illustrates an embodiment of a pneumatic conveyor system comprising a plurality of tubular conveyor conduits, three conduits 67, 68 and 69 being shown by way of example. Inlet metering device 64 is mounted between common inlet conduit 66 and the inlets of the conveyor conduits, the metering device being arranged as switching means 65 for distributing the assembly parts from the inlet to a selected conveyor conduit. The illustrated switching means comprises movable guide baffles 70, 71 for connecting the selected conveyor conduits to common inlet conduit 66. As schematically indicated, the guide baffles are linked to adjustment drives 72, shown as pneumatic motors, to pivot the guide baffles between the switching positions shown in full, broken and chain-dotted lines.

When guide baffles 70, 71 are in their position shown in full lines, the assembly parts are directed from inlet conduit 66 to conveyor conduit 68. When baffle 70 is moved into the position shown in broken lines, the assembly parts are directed into conveyor conduit 67 and when baffle 71 is pivoted in the broken-line position, the assembly parts are directed into conveyor conduit 69. When it is desired to block delivery of assembly parts to any of the conveyor conduits, guide baffles 70 and 71 are pivoted into the positions shown in chain-dotted lines. In this position, the guide baffles constitute a blocking mechanism 73.

Advantageously, the control for the pneumatic conveyor system of the present invention will include solenoid valves regulating the air flow to the drive means for the assembly parts and the adjustment drive for the blocking mechanism, these valves being responsive to the control signals transmitted from the sensing devices in the conveyor conduits.

Obviously, instead of mechanical blocking members, as herein described and illustrated, the blocking mechanism may be operated with electromagnetically actuated blocking means. The pneumatic motors for positioning the blocking members may similarly be replaced by other drives. Any type of sensing device may be used for indicating the presence of an assembly part at a given point in the conveyor conduit to signal how full or empty the conduit is. Such sensing devices may be constituted by proximity switches, optical eyes, radar or ultrasonic devices.

The construction of the conveyor conduits may be adapted to the nature of the parts to be conveyed therethrough. Synthetic resin hoses or tubes are very useful as conduits for non-ferrous and other metallic assembly parts, particularly springs. Brass pipes may be used for conveying stainless steep parts, for example, to prevent electrostatic charges from building up in the conduits and thereby creating jamming. Other suitable materials may be used for conveying assembly parts under relatively high pressure. The advantage of using elastic synthetic resin tubes is their ability to permit trouble-free passage of the parts even where the tolerances are relatively large.

Where the conveyed assembly parts are springs, the system may comprise a spring bias measuring device associated with the inlet metering device. The spring bias measuring device may be arranged downstream or upstream of the inlet metering device and since the springs are fed to the system one by one, the bias of each spring may be measured, for example, by compressing the spring under pneumatic pressure whose size is the measure of the spring bias. Such an arrangement is particularly advantageous when feeding double-conical springs which, when entangled, cannot be separated by the usual vibratory baffle plates in the feeding apparatus. When the spring bias is measured at the inlet, it can be determined immediately whether a single spring is being feed or whether two entangled springs are involved.

What is claimed is:

1. A pneumatic conveyor system adapted for the conveyance of assembly parts, comprising
   (a) a tubular conveyor conduit having an inlet and defining a conveyance path,
   (b) a pneumatically operable drive means in the conveyance path,
   (c) a control for operating the drive means, and
   (d) an inlet metering device associated with the conveyor conduit upstream of the drive means, the metering device including
      (1) a blocking mechanism responsive to the control for cyclically blocking and unblocking the conveyance path, and comprising a blocking pin movable transversely into and out of the conveyance path for blocking and unblocking conveyance through the conduit, the blocking pin being capable of retaining the assembly parts when moved transversely into the conveyance path, and an adjustment drive for moving the blocking pin.

2. The pneumatic conveyor system of claim 1, wherein the pin has a point at the leading end thereof.

3. The pneumatic conveyor system of claim 1, wherein the drive means comprises a venturi tube.

4. A pneumatic conveyor system of claim 1, further comprising an air inlet member arranged in the conveyor conduit between the inlet metering device and the drive means.

5. The pneumatic conveyor system of claim 4, wherein the conveyor conduit has an outlet and an air venting member is arranged in the conveyor conduit between the drive means and the outlet.

6. The pneumatic conveyor system of claim 5, wherein the air inlet and venting members are perforated tubular portions inserted in the conveyor conduit.

7. The pneumatic conveyor system of claim 6, wherein the conveyor conduit has a cross-sectional area exceeding the total areas of the perforations in the tubular portions.

8. The pneumatic conveyor system of claim 5, wherein the drive means is arranged substantially centrally between the inlet and the outlet.

9. The pneumatic conveyor system of claim 5, wherein the conveyor conduit comprises a storage path upstream of the outlet, and the air venting member is arranged substantially centrally between the drive means and the storage path.

10. The pneumatic conveyor system of claim 9, further comprising sensing devices signalling the presence of an assembly part in the conveyor conduit, the sensing devices being spaced from each other in the direction of the conveyance path and a respective one of the sensing devices being arranged at the beginning and the end of the storage path.

11. The pneumatic conveyor system of claim 1, comprising a plurality of independent tubular conveyor conduits, and the control for operating the drive means of each independent conveyor conduit including independently operable control elements for the drive means and the inlet metering device of each independent conveyor conduit.

12. The pneumatic conveyor system of claim 1, comprising a plurality of said tubular conveyer conduits, a common inlet conduit and the inlet metering device being mounted between the common inlet conduit and the inlets of the conveyor conduits, the metering device being arranged as a switching means for distributing the assembly parts between selected ones of the conveyor conduits.

13. The pneumatic conveyor system of claim 12, wherein the switching means comprises movable guide baffles for connecting the selected conveyor conduits to the common inlet conduit.

14. A pneumatic conveyor system adapted for the conveyance of assembly parts, comprising
    (a) a tubular conveyor conduit having an inlet and defining a conveyance path,
    (b) a pneumatically operable drive means in the conveyance path,
    (c) a control for operating the drive means, and
    (d) an inlet metering device associated with the conveyor conduit upstream of the drive means, the metering device including
        (1) a blocking mechanism responsive to the control for cyclically blocking and unblocking the conveyance path, and
    (e) an apparatus for disentangling springs, orienting the disentangled springs and classifying the oriented springs associated with the pneumatic conveyor system, the apparatus having an outlet for the oriented and classified springs, and the conveyor conduit having an outlet remote from the outlet of the apparatus, further comprising a transfer conduit arranged between the outlet of the apparatus and the inlet of the conveyor conduit, air jet means in the transfer conduit directed countercurrently to the direction of conveyance of the springs, the transfer conduit defining a passage for the springs and having a transverse bore communicating with the passage, and the blocking mechanism comprising a blocking member slidable in the bore into and out of the passage, and an adjustment drive for sliding the blocking member supported on the transfer conduit.

15. The pneumatic conveyor system of claim 14, wherein the conveyor conduit has an outlet and a storage path upstream of the outlet, further comprising sensing devices arranged at the outlet and the storage path for signalling the presence of an assembly part in the conveyor conduit, the control having an input and an output, the input of the control being connected to the sensing devices for receiving the output signals therefrom, and the output of the control being connected to the blocking mechanism and the drive means for receiving the output signals therefrom for cyclically blocking and unblocking the conveyance path and for operating the drive means in response to the output signals.

16. The pneumatic conveyor system of claim 15, further comprising a control for the apparatus, the apparatus control having an input connected to the output of the drive means control for receiving the output signals therefrom.

17. A pneumatic conveyor system adapted for the conveyance of assembly parts, comprising
    (a) a tubular conveyor conduit defining a conveyance path and having an inlet and an outlet arranged for manual removal of the conveyed parts,
        (1) at least an upper portion of the conveyance path being open in the outlet area for a length less than that of the conveyed parts,
    (b) a pneumatically operable drive means in the conveyance path,
    (c) a control for operating the drive means,
    (d) an inlet metering device associated with the conveyor conduit upstream of the drive means, the metering device including
        (1) a blocking mechanism responsive to the control for cyclically blocking and unblocking the conveyance path,
    (e) an abutment at the end of the conveyance path, and
    (f) a sensing device in the end area signalling the presence of an assembly part thereat.

* * * * *